United States Patent [19]

Balkanli

[11] 4,279,155

[45] Jul. 21, 1981

[54] BOURDON TUBE TRANSDUCER

[76] Inventor: Hayati Balkanli, P.O. Box 35725, Houston, Tex. 77035

[21] Appl. No.: 115,003

[22] Filed: Jan. 24, 1980

[51] Int. Cl.³ .......................... G01K 5/36; G01L 9/12
[52] U.S. Cl. ..................................... 73/368.6; 73/733; 361/282; 361/283
[58] Field of Search ...................... 73/733, 732, 368.6; 331/65, 66; 336/30; 361/282, 283

[56] References Cited

U.S. PATENT DOCUMENTS

| Re. 24,267 | 1/1957 | Ostermann et al. | 73/735 |
| 3,013,234 | 12/1961 | Bourns | 73/733 |
| 3,356,963 | 12/1967 | Buck | 361/283 |
| 3,605,500 | 9/1971 | Trekell | 73/735 |
| 3,968,691 | 7/1976 | Balkanli | 73/345 |

*Primary Examiner*—Donald O. Woodiel
*Attorney, Agent, or Firm*—Richard K. Robinson

[57] ABSTRACT

A bourdon tube transducer has included a bourdon tube with a conductive plate electrically separated from the bourdon tube and in parallel with the bourdon tube. As the pressure varies, so does the electrical reactance between the bourdon tube and the conductive plate and this variation is used to vary the frequency of an electrical oscillator that is connected to the bourdon tube and the conductive plate.

4 Claims, 4 Drawing Figures

BOURDON TUBE TRANSDUCER

BACKGROUND OF THE INVENTION

This invention relates to bourdon tube transducers.

There are very few transducers that provide information which may be utilized directly by the users without a basic transformation of the output. In most cases, the transformation consists of some form of amplification and indication for measuring the output of the transducer. The bourdon tube is a basic transducer which transduces either a pressure or temperature unit area into a mechanical angle displacement. Depending upon the type of bourdon tube used, especially the geometrical configuration, either mechanical or electromechanical devices are used to amplify the bourdon tube's output. Where the application of the bourdon tube calls for amplification, the tube size must be increased to provide additional force to drive the amplifying device. For example, where mechanical amplification is used and the angular displacement is increased in size, the bourdon tube is a helical or spiral tube of a number of turns sufficient enough to provide the desired angular displacement. In the cases where the bourdon tube is limited to a single turn or a fraction thereof, the diameter is enlarged to increase the output displacement. This is, of course, due to the fact that when the bourdon tube is coupled to a mechanical or an electromechanical amplifying system, it has to provide an increase in the output torque to drive the mechanical or electromechanical amplifying system. To increase the torque, the size of the oval tube which constitutes the bourdon tube, is enlarged. Whenever these solutions are chosen, the weight of the bourdon tube will inevitably increase. This, in turn, will introduce a weight effect deviation to the performance curve of the bourdon tube. Similarly, when helical or spiral configuration tubes are used, not only is there the weight effect on deviation, but the fact that in response to the spurious mechanical stimulations, the bourdon tubes will oscillate. The resonant frequency of oscillation is inversely proportional to the weight of the bourdon tube. In order to suppress these mechanical oscillations, mechanical or fluidic dampers are used. These will, of course, increase the weight and result in further degradation of the performance curve of the bourdon tube. The bourdon tube is a spring in nature and its output equation contains a coefficient of the modulous of elasticity. Depending on the composition of the alloy used to make the bourdon tube, the output performance curve varies with temperature and pressure.

In particular, in the production area of the petroleum industry, bourdon tubes are used to measure temperature and pressure within the oil well or "down hole". Due to the fact that the oil well requires an apparatus in cylindrical geometry with a diameter as small as possible, the physical shape of the bourdon tube is critical, especially if there are the additional torque requirements, in which case the bourdon tube becomes helical. In general, the size of the bourdon tube for down hole metering varies from 2/10th's of an inch OD, with three inches length, to 9/10th's of an inch OD with a 15 inch length. The helical configuration exhibits tendencies to oscillate. The additional weight, lack of geometrical symmetry and temperature and/or pressure deviations for the down hole instrument result in limited accuracy and/or range of operation. The majority of accuracy problems originate from the intolerance of the mechanical linkage of the bourdon tube to the meter indication and hysteresis.

Inherently, the bourdon tubes do not have any effective hysteresis. However, due to improper design and processing, they will exhibit hysteresis as high as a few percent of the overall accuracy. All of these factors tend to contribute to the overall accuracy and reliability of the bourdon tube as a transducer. However, it has been found that the bourdon tube is the preferred transducer to use for down hole metering when compared to other instruments.

The traditional output of many evironmental condition sensing apparatus is an analog device which limits the accuracy to a few percent of the full scale readings. There is, however, an instrument which digitizes the primary output of the bourdon tube with an optical encoder, reference may be made to U.S. Pat. No. 3,968,691. The calibration curves of this apparatus distinctly indicate the existence of the weight and temperature degradation of the bourdon tubes. Some manufacturers choose strain gage transducers in order to avoid vibratory and temperature degradation as well as size limitation without improving the accuracy as much as they would like to. The strain gage transducers also have a 4/10th's of a percent hysteresis error as well as other errors.

SUMMARY OF THE INVENTION

A bourdon tube transducer has included a bourdon tube with a conductive plate electrically separated from the bourdon tube and in parallel with the bourdon tube. As the pressure varies, so does the electrical reactance between the bourdon tube and the conductor, and this variation is used to vary the frequency of an electrical oscillator that is connected to the bourdon tube and the conductive plate.

The bourdon tube transducer described herein has additional advantages in that it is small in size, lightweight and provides a pseudodigital output which may be utilized effectively for providing either pressure or temperature indication. The small size of the bourdon tube is due to the fact that only a fraction of a turn is used and this facilitates the application of the disclosed bourdon tube for down hole environmental metering.

DETAILED DESCRIPTION OF THE PREFERRED EMBODIMENT

Figure 1:
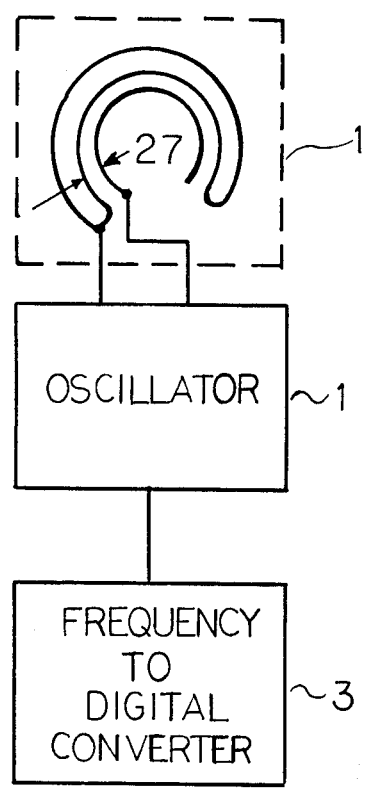
FIG. 1 is a block diagram of the bourdon tube transducer and metering circuits according to the invention.

In FIG. 1, to which reference should now be made, there is a bourdon tube transducer 10 which senses either pressure or temperature and is connected to an oscillator 1. The oscillator 1 is the type of oscillator in which the output frequency will vary linearly or piecewise linearly with the change in reactance within its tuning circuit. There are many types of oscillators known in the art that meet the requirements amongst which are the Clapp and Vackar oscillators. The oscillator provides an output that is applied to a frequency-to-digital converter 3, which converts the reading of the oscillator into a digital representation of the measuring units such as degrees or pounds per square inch. The transducer 10 is the sensing element for sensing either temperature or pressure and reflecting the temperature or pressure as a variation in electrical reactance for the oscillator 1.

Figure 2:
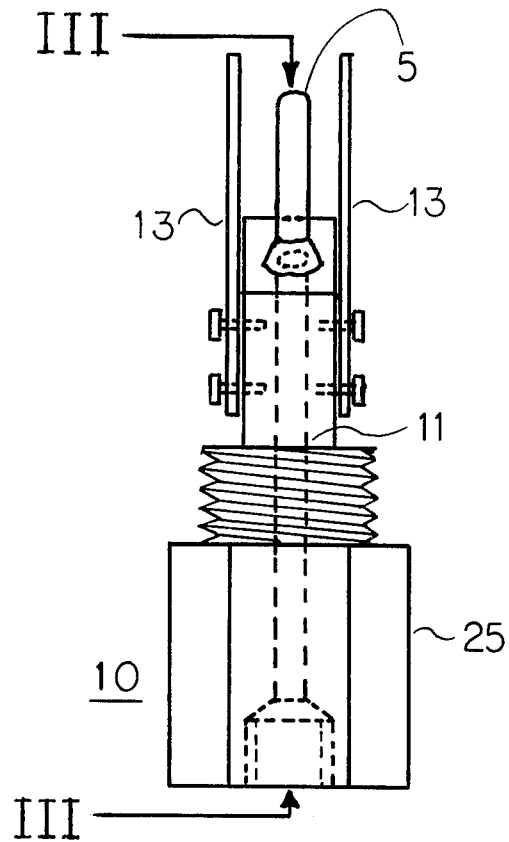
FIG. 2 is a simplified diagram of the bourdon tube.

In FIG. 2, there is shown a bourdon tube transducer for use in down hole metering and provides a bourdon tube 5 mounted on a base assembly 25. There is a hollow tube 11 going through the base assembly which is connected to the hollow bourdon tube 5. The side plates 13 are used for mounting of the electronic components used in the oscillator 1.

Figure 3:
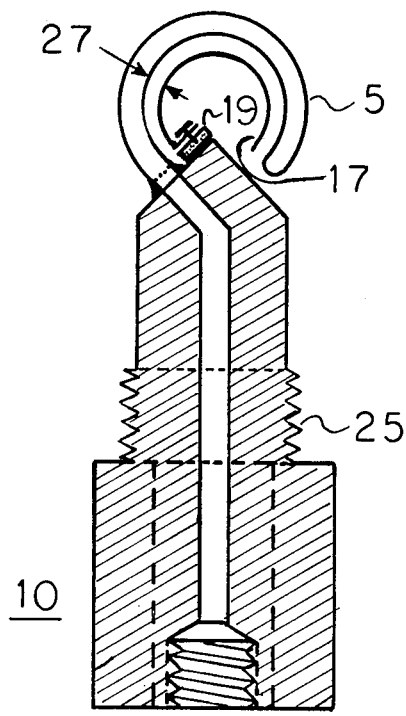
FIG. 3 is a sectional diagram of a bourdon tube pressure transducer.

FIG. 3 is a sectional view of the bourdon tube of FIG. 2 that is used as a pressure transducer. There is mounted to the base 25 a conductor plate 17 which is shaped to coincide with the internal curvature of the bourdon tube. The conductive plate 17 is electrically insulated from the bourdon tube 5 and the base 25 by means of an electrical insulator 19. The conductive plate 17, as mentioned earlier, is mounted so that its surface is parallel with the inner surface of the bourdon tube 5 and separated by a distance that is indicated by the arrows 27. As the pressure varies, the bourdon tube 5 will bend such that the separation between the conductive plate 17 and the bourdon tube will change. This change will cause the reactance in the tuned circuit of oscillator 1 to change, and thus result in a corresponding frequency change. The configuration of the conductive plate 17 and the bourdon tube 5 can present a capacitive reactance or an inductive reactance. Without the conductive plate 17, bourdon tube 5 constitutes a turn of an inductor. As the pressure increases, the diameter of the bourdon tube increases. This, in turn, changes the inductance of the single turn inductor which is formed from the bourdon tube.

Figure 4:
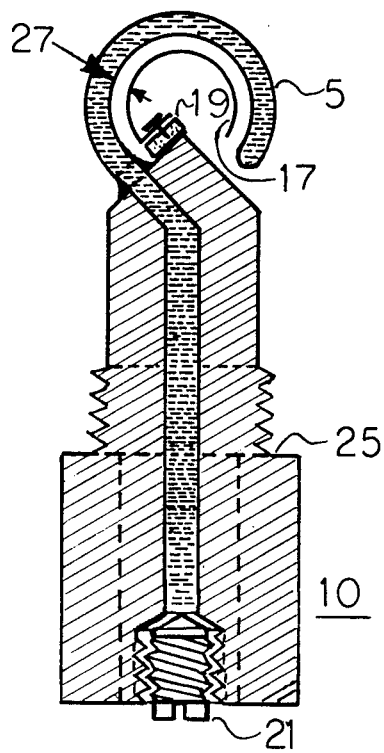
FIG. 4 is a sectional diagram of a bourdon tube temperature transducer.

In FIG. 4, there is shown a bourdon tube which is used to measure temperature and is essentially identical to the bourdon tube of FIG. 3, with the exception that the bourdon tube 5 is sealed at both ends and filled with a liquid such as silicon oil or other liquids that have a high coefficient of expansion. The liquid is sealed within the bourdon tube by means of the plug 21. As the temperature varies, the internal pressure of the bourdon tube varies, and hence the distance between the conductive plate 17 and the bourdon tube 5 varies and this results in a change in frequency of the oscillator 1.

Many changes and modifications in the above described embodiment of the invention can, of course, be carried out without departing from the scope thereof. Accordingly, to promote the progress in the science and useful arts, the invention is disclosed and is intended to be limited only by the scope of the appended claims.

I claim:

1. An environmental parameter transducer comprising:
    a bourdon tube means for sensing an environmental parameter at a remote port;
    an electrical circuit controlled by the bourdon tube means;
    means for providing an electrical reactance in the electrical circuit means, including an electrical conductive plate that has the same curvature as the bourdon tube means, of the same material as the bourdon tube means; and
    means for retaining the conductor in a parallel configuration with the bourdon tube means separated therefrom by a preselected distance and electrically insulated therefrom.

2. The environmental parameter transducer according to claim 1 wherein the environmental parameter is temperature and the bourdon tube means comprises:
    a bourdon tube filled with a liquid and thermally connected to the remote port.

3. The environmental parameter transducers according to claims 1 or 2, further comprising:
    means for measuring the value of the reactance in the electrical circuit.

4. The environmental parameter transducers according to claim 3 wherein the means for measuring the value of the reactance in the electrical circuit comprises:
    an electrical oscillator connected in the electrical circuit such that the frequency of the oscillation is determined by the electrical reactance existing between the bourdon tube and the conductor.

* * * * *